United States Patent
Gougelet

[19]

[11] Patent Number: 6,155,323
[45] Date of Patent: Dec. 5, 2000

[54] TIRE CHANGING BAG

[76] Inventor: Robert M. Gougelet, P.O. Box 5220, Hanover, N.H. 03755

[21] Appl. No.: 09/389,877

[22] Filed: Sep. 2, 1999

Related U.S. Application Data

[60] Provisional application No. 60/099,198, Sep. 2, 1998.
[51] Int. Cl.[7] .................................................. B27H 7/00
[52] U.S. Cl. .............................. 157/1; 157/1.7; 242/42.26
[58] Field of Search ........................ 157/1, 1.17; 141/97; 224/42.12, 42.26, 42.27, 42.28

[56] References Cited

U.S. PATENT DOCUMENTS

| | | |
|---|---|---|
| 2,407,049 | 9/1946 | Winarsky et al. . |
| 2,792,056 | 5/1957 | Ricketts et al. . |
| 2,835,318 | 5/1958 | Conger . |
| 2,881,835 | 4/1959 | Engstrom . |
| 3,495,647 | 2/1970 | Branick . |
| 3,559,715 | 2/1971 | Leslie . |
| 4,036,274 | 7/1977 | Peel, Sr. . |
| 4,057,093 | 11/1977 | Joines ............................................. 157/1 |
| 4,147,195 | 4/1979 | Halfacre . |
| 4,381,027 | 4/1983 | Molen et al. . |
| 4,479,522 | 10/1984 | Lapham ......................................... 157/1 |
| 4,505,309 | 3/1985 | Adelman et al. . |
| 4,538,659 | 9/1985 | Adelman et al. . |
| 4,609,025 | 9/1986 | Messenger ..................................... 157/1 |
| 4,865,104 | 9/1989 | Mannen . |
| 5,449,031 | 9/1995 | Burklund ........................................ 157/1 |
| 5,623,981 | 4/1997 | Cunningham et al. . |
| 5,803,324 | 9/1998 | Silberman et al. .................... 224/42.23 |
| 5,921,449 | 7/1999 | Saegusa et al. ............................ 224/42.2 |

*Primary Examiner*—Stephen F. Gerrity
*Assistant Examiner*—Hadi Shakeri
*Attorney, Agent, or Firm*—Nancy E. Ownbey; Rod D. Baker; Deborah A. Peacock

[57] ABSTRACT

A protective bag for safely servicing a tire. The bag comprises a flexible fabric that is preferably permeable to air, and is fastened around a tire using a plurality of securely fastenable straps.

10 Claims, 4 Drawing Sheets

TIRE CHANGING BAG

CROSS-REFERENCE TO RELATED APPLICATIONS

This application claims the benefit of the filing of U.S. Provisional Patent Application Serial No. 60/099,198, entitled "Tire Changing Bag", filed on Sep. 2, 1998, and the specification thereof is incorporated herein by reference.

BACKGROUND OF THE INVENTION

1. Field of the Invention (Technical Field)

The present invention relates to an apparatus fostering safe removal of an inflated tire from a wheel rim, or to otherwise work upon a mounted tire, by providing improved protection against accidental explosions of the pressurized tire.

2. Background Art

It is known that working on an inflated vehicle tire which is mounted on a wheel can be dangerous. One of the more dangerous operations in servicing vehicles involves changing and servicing tires. Pneumatic tires, particularly the tires of large tractor-trailer rigs and heavy-duty construction machinery, are mounted on massive wheel rims and inflated to high pressures. The high pressures involved can cause catastrophic explosions while the mounted tire is being inflated, or immediately after a tire is mounted upon a wheel, resulting from the tire bursting or being blown off the wheel. This can occur after approximately 20–30 pounds of pressure has been built up within the tire. Explosions can be due to a variety of causes, including a failure in the seal along the tire bead (the portion of the tire adapted to be sealed against the rigid wheel rim), an improper seal, atypical forces placed upon the tire sidewall, or over-inflation tire failure. The hazards associated with inflating and handling mounted tires can be ameliorated by thorough training of tire maintenance personnel, and the use of proper equipment and facilities. Nevertheless, the possibility of a tire-bead failure or other mishap is virtually ever-present when one is handling a mounted tire, even with trained personnel and the use of proper tire-handling and changing/mounting equipment. Such hazards include the explosion catapulting the removable ring or lock ring with force capable of decapitating a person, or throwing ripped shreds of tire in unpredictable directions.

There is a need for a protective apparatus that shields and protects the user who handles a mounted tire against the force of an accidental tire explosion. There are some devices known the art which are intended to provide protection against catastrophic failure, but the known devices generally suffer from one or more shortcomings. Many are adapted for use only in the sophisticated mechanic's workshop, and/or are expensive to install or maintain. These devices include those described in U.S. Pat. No. 5,623,981, to Cunningham et al., entitled *Safety Barrier for Rim Holding Tire Changers*, which discloses a barrier attached to a rim holding tire changer, designed to remove the worker from the field of the explosion; and U.S. Pat. No. 4,865,104, to Mannen, entitled *Tire Changer Safety Apparatus and Method*, which discloses a hold-down bar and air inflation pressure valve attached to a tire changing assembly. Many devices are heavy or cumbersome, which precludes or limits their portability. These devices include U.S. Pat. No. 4,381,027, to Molen et al., entitled *Tire Inflation Safety Cage;* U.S. Pat. No. 3,495,647, to Branick, entitled *Safety Cage for Postinflation Apparatus;* U.S. Pat. No. 2,407,049, to Winarsky et al., entitled *Tire Inflation Guard;* U.S. Pat. No. 4,036,274, to Peel, Sr., entitled *Safety Cage for Tire Inflation;* and U.S. Pat. No. 2,792,056, to Ricketts et al., entitled *Guard for Tire Inflation,* all disclosing various "cages" for containing a tire while inflating. These "cages" do not prevent shards or strips of tire from dislodging and being forcibly expelled through/between the "cage" bars. Other restraining devices include U.S. Pat. No. 4,505,309, to Adelman et al., entitled *Tire Inflation,* and U.S. Pat. No. 4,538,659, to Adelman et al., entitled *Safe Tire Inflator,* both disclosing a box into which a tire can be placed while inflating. These devices are bulky, which makes them less desirable for portability. Still other devices are designed to prevent ring dislocation, but also do not address the problem of shreds from the tire becoming airborne. These include U.S. Pat. No. 2,835,318, to Conger, entitled *Tire Inflation Guard,* U.S. Pat. No. 2,881,825, to Engstrom, entitled *Adjustable Lock Ring Safety Clamp for Truck Wheels,* U.S. Pat. No. 4,147,195, to Halfacre, entitled *Truck Tire Safety Clamp,* and U.S. Pat. No. 3,559,715, to Leslie, entitled *Truck Tire Inflating Device,* all disclosing various clamps and devices to fit inside the rim and stabilize the lock ring during tire inflation and mounting. It is sometimes desirable to be able to change or mount a tire "in the field," that is, on the road at the scene of a tire failure and required replacement, without transporting an excessive amount of equipment. Also, many known devices are complicated to use, which discourages their use.

The present invention is an apparatus for preventing flying debris from tire explosions during mounting or inflation.

It successfully overcomes the unsolved difficulties of the prior art by providing a simple, lightweight, portable, easy-to-use safety device for use during tire changes, repairs, mounting, and dismounting. By being portable, the invention can be stored on board a vehicle to be available for use nearly anywhere at any time. Because the device is simple to use, the mechanic is more apt to use the invention. The present invention also is less expensive to manufacture than the more complicated devices typifying the known art.

A fundamental aspect of the invention is its exploitation of modern materials technologies, particularly relatively recent advances in the fields of textile and fabrics. Formerly, the tremendous forces resulting from a pneumatic tire explosion could be reliably contained only with bulky box- or cage-like devices fashioned from metal bars or panels, thus leading to the complicated and non-portable devices discussed above. With the present invention, however, the force of the blast is contained by a flexible, lightweight bag or cover which can be folded or rolled for easy storage or transportation and simple use.

SUMMARY OF THE INVENTION
(DISCLOSURE OF THE INVENTION)

A preferred embodiment of the present invention comprises an apparatus for protectedly servicing a tire, the apparatus comprising a flexible bag to contain the tire, a plurality of straps removably wrapped around the bag, and a plurality of fastening devices for securing the wrapped straps around the bag. Preferably, the bag comprises woven Kevlar®, ballistic nylon or other durable, strong fabrics. Preferably, the bag is permeable to air, and is preferably toroidal, donut, square, or other shape. The straps preferably comprise an arrangement radiating outward from the center of the bag.

The invention also comprises a method of protectedly servicing a tire comprising the steps of inserting a tire into a flexible bag, securing the tire within the bag, and servicing the tire. Preferably, the step of inserting a tire into a flexible bag comprises inserting a tire into a toroidal-shaped bag, preferably comprising woven Kevlar®, ballistic nylon or other durable, strong fabrics, preferably that is permeable to air. Preferably, the step of securing the tire within the bag comprises securing the tire with a plurality of straps wrapped around the bag.

A primary object of the present invention is to provide an apparatus for safe removal of an inflated tire from a wheel rim.

Another object of the present invention is to provide an apparatus to contain tire shreds resulting from an explosion during mounting or inflation.

A further object of the present invention is to provide a portable apparatus for safely mounting and inflating tires in the field.

Still another object of the present invention is to provide an apparatus for safely mounting and inflating tires that is less expensive.

A primary advantage of the present invention is the portability of the apparatus.

Another advantage of the present invention is the ease of use of the apparatus.

A further advantage of the present invention is the comparatively low cost of producing the apparatus.

Still another advantage of the present invention is the light weight of the apparatus.

Yet a further advantage of the present invention is the ability to use the apparatus in the field.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying out the Invention

Figure 1:
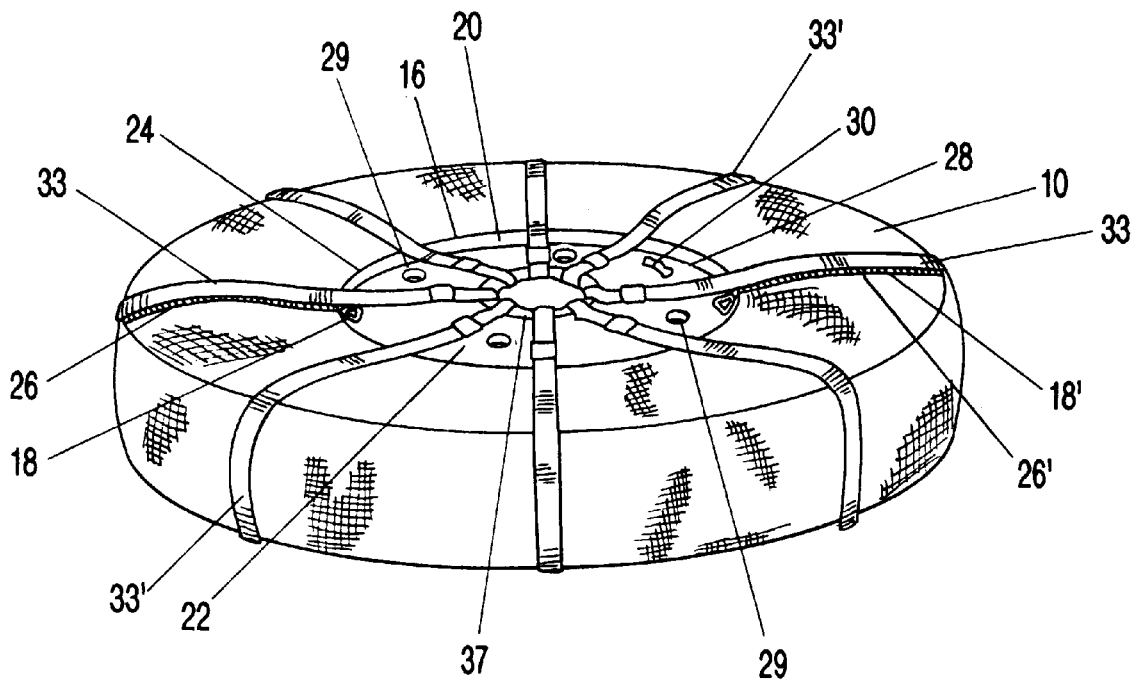
FIG. 1 is a perspective view of a preferred embodiment of the invention, shown installed in a protective position upon an inflated tire.

A preferred embodiment of the apparatus is shown in FIGS. 1–5. As shown in FIG. 1, the invention preferably comprises bag 10 which may be wrapped around tire 20 which is to be inflated upon a conventional wheel 22. Bag 10 can be configured in nearly any pattern which permits tire 20 to be enclosed therein. Bag 10 thus may be in the form of a sack or bag, which has a selectively closeable opening which permits the insertion of mounted tire 20.

Figure 2:
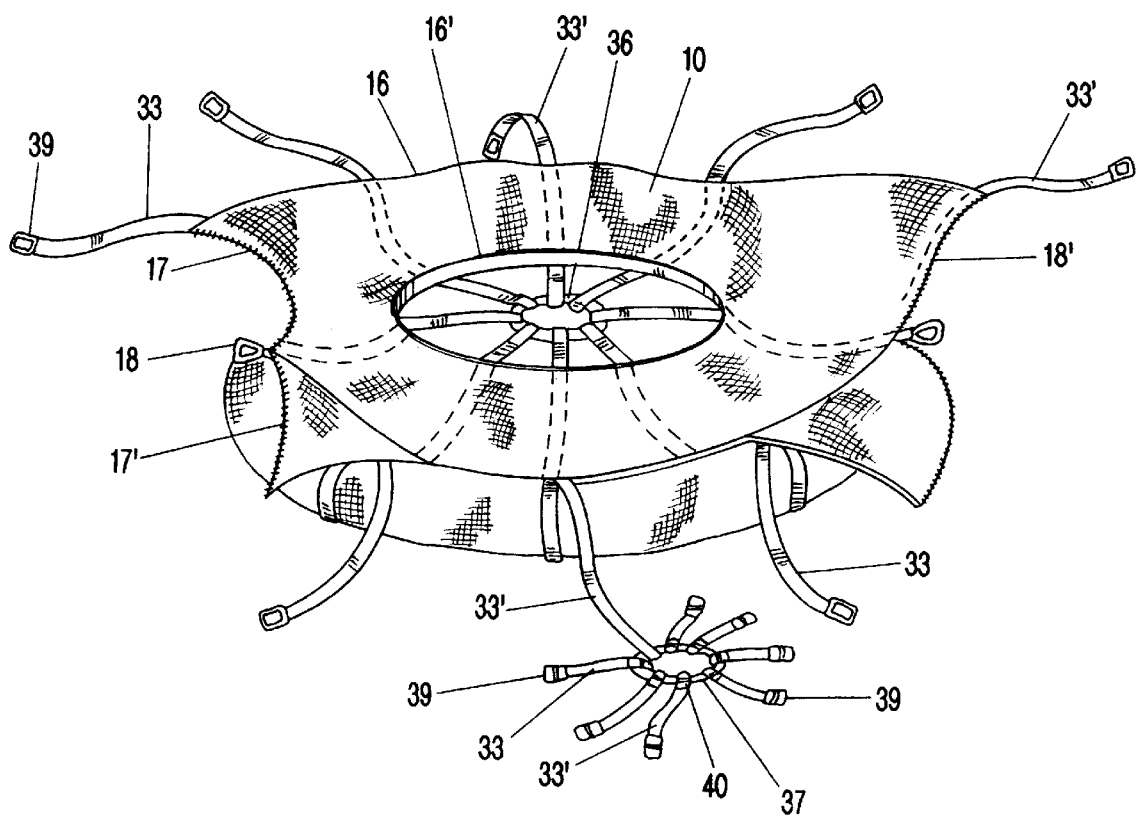
FIG. 2 is a perspective view of a preferred embodiment of the invention, showing the apparatus in an open position.
Figure 4:
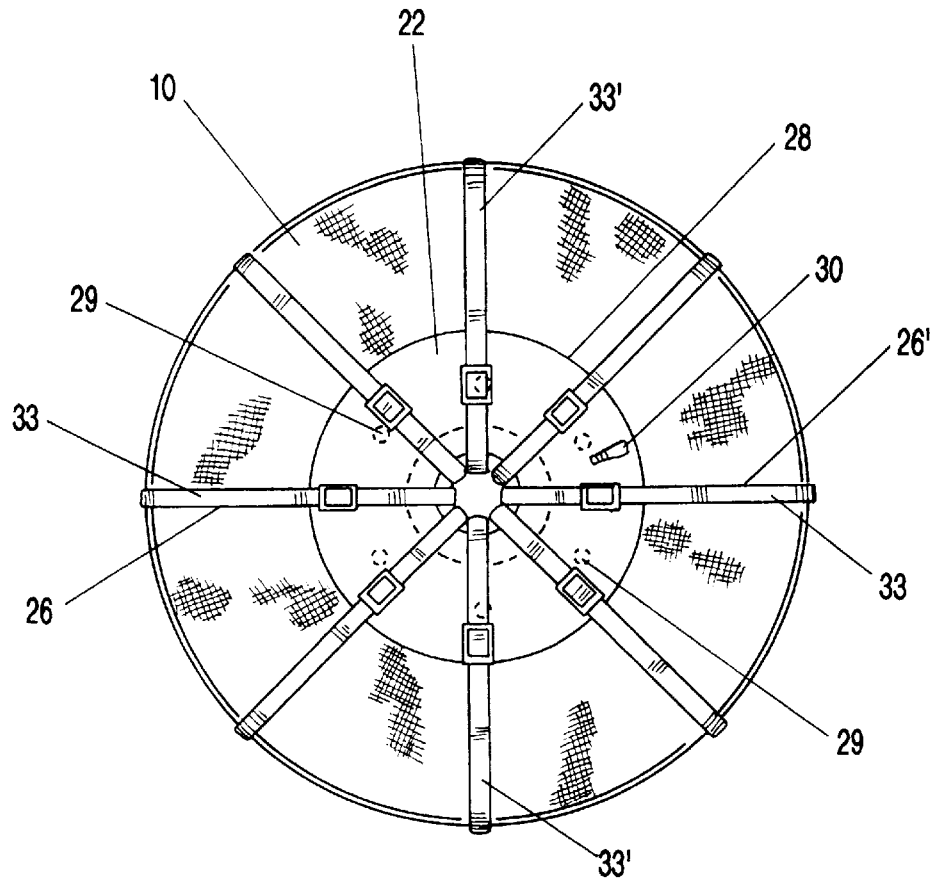
FIG. 4 is a top view of a preferred embodiment of the apparatus in the closed position, installed in the protective position upon an inflated tire.
Figure 5:
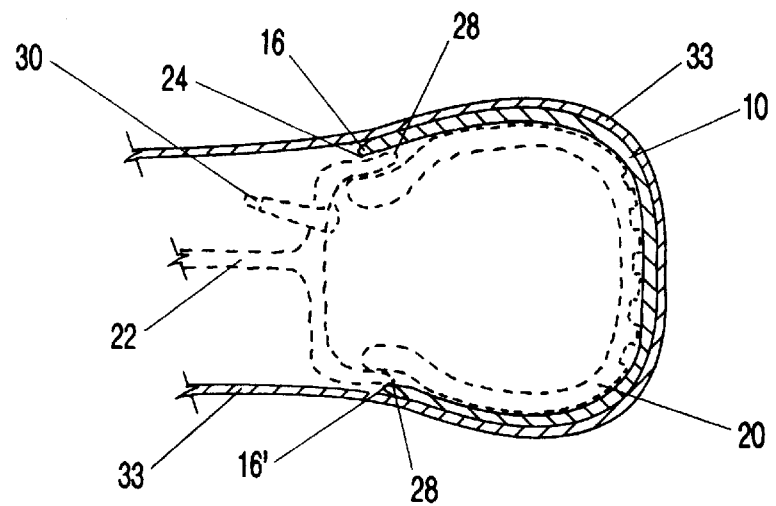
FIG. 5 is a radial cross-sectional view of a preferred embodiment of the invention, installed upon a tire.

In the illustrated embodiment, bag 10 is preferably shaped generally in the form of a torus or "doughnut," sized to correspond to the typical mounted tire which is to be contained. Thus, the main portion of bag 10 serves as a sort of sleeve or envelope, approximately following the exterior contours of the sidewalls and tread of tire 20, as shown in FIG. 5. The "doughnut hole" defined by bag 10 is left mostly open, to allow access to wheel 22, including wheel rim 28, lug nut holes 29, valve stem 30, and other items which generally must be available to allow the tire to be inflated, serviced, or placed upon the wheel lugs of a vehicle. The torus has annular slit opening 24, defined by interior edges 16, 16', which runs around the complete inner circumference defining the "doughnut hole" of bag 10. Opening 24, coupled with a pair of radial access slits 26, 26' along opposing sides of bag 10, permit the bag to be opened as shown in FIG. 2 to receive tire 20 therein. With bag 10 installed upon tire 20, wheel rim 28 accordingly is substantially proximate and concentrically parallel to slit opening 24, so that wheel 22 is mostly exposed while tire 20 is mostly contained within bag 10, as shown in FIGS. 1, 4, and 5.

Bag 20 is fashioned from a strong, durable, tear-resistant flexible substance, preferably a fabric capable of withstanding the blast force of a tire explosion. The fabric may comprise, for example, ballistic nylon or woven Kevlar® material, preferably a Kevlar® twill of a 60–40 weave. It is desirable, however, that the fabric not be from an unusually tight or dense weave; rather, it is preferred that the weave be sufficiently loose as to permit a significant discharge of moving air to pass readily through bag 10 in the event of an explosion. With the fabric's ability to pass some of the moving air resulting from an explosion, the fabric acts as a sort of baffle or damper on the force of the explosion, while containing the more destructive components of the blast. If the fabric of bag 10 does not allow passage of some of the energy of the blast, in the form of rapid-velocity air flow, then the ability of bag 10 to contain the more harmful components of the blast (e.g., shrapnel from the tire and/or rim, valve stems, and the like) may be compromised by a failure of bag 10 itself. Preferably, bag 10 when properly installed is capable of resisting from about 150 to about 200 psi of pressure resulting from an explosion. The fabric may be treated with a variety coating substances known to reduce wear, render the fabric fireproof, resist mildew, impart chemical resistance (e.g. protect against corrosive chemicals, brake fluids, etc.). Advantageously, the fabric of bag 10 may absorb these treatment chemicals to improve their performance. It is understood, however, that absorption is not a limitation, and the incentive apparatus may be practiced with desirable treatments that coat the bag material rather than being absorbed thereby.

Bag 10 may be color-coded or otherwise labeled to indicate the tire size for which use would be appropriate. It may also be labeled as to date of manufacture, to foster the timely retirement of aged bags.

In alternative embodiments, bag 10 may be simply fashioned from a pair of disk-shaped panels sewn together along their peripheries, thus forming a two-ply pocket or pouch sized to contain a tire and having a simple cable drawstring-type closure. Alternatively, bag 10 may be square, oval, or other shapes.

Reference to the figures also shows that bag 10 preferably is reinforced, as well as secured in place upon tire 20, by a plurality of radially arranged straps 33, 33'. Straps 33, 33' preferably are made from nylon webbing. Alternatively, chains, ropes, or cables may serve as straps. Each strap 33 is in contact with bag 10. The strap may merely be temporarily placed against the bag and cinched or buckled into position, or may be sewn or otherwise permanently adhered to the bag along the portion of the length of the strap in contact with bag 10. As shown, when bag 10 is properly positioned about tire 20, each strap 33, 33' wraps around tire 20 (with the fabric of bag 10 between strap 33 and tire 20) adjacent to the tread and sidewall portions of tire 20. The two ends of each strap 33, 33' are free to extend radially inward toward the center of wheel 22, where the respective ends are attached to central holding rings 36, 37 on either side of wheel 22. As best seen in FIG. 2, each strap 33, 33' has a segment which may be permanently attached to upper central holding ring 36, with engageable buckles 39, 40 used to secure the two segments together to complete the full strap. The overall strap configuration, when the apparatus is in use upon a tire, can be characterized as radially disposed "spokes" extending outward from the hub of wheel 22 in two parallel planes, the proximate ends of the "spokes" secured to the respective central holding rings 36, 37, and the distal ends of the "spokes" wrapping around the tire sidewalls and being conjoined in the vicinity of the tire tread. The ends of straps 33, 33' may for simplicity, convenience, and strength be permanently secured to central rings 36, 37, with strap detachability being provided by strap buckles 39, 40, as shown in FIG. 2.

It is seen therefore, that the presence of straps 33, 33' dramatically improves the strength of bag 10 by reinforcing the bag against the radially directed forces associated with a tire explosion. Also, the straps are used to removably secure bag 10 in place upon tire 20 while the apparatus is in use.

It is not desirable for bag 10 to be air-tight when closed. Accordingly, circumferential opening slit 24 need not be secured closed by drawing the interior edges 16, 16' together; rather, interior edges 16, 16' simply rest against the sidewalls of tire 20, or against wheel 22, when bag 10 is in use. It is desirable, however, to improve the strength of bag 10, by providing some means for securing together two top edges 17, 17' which define either of access slits 26, 26' on the top of bag 10. Access slits 26, 26' may be provided, for example, with zipper 18, 18' closures to secure the access slits when the bag is in use and thus improve the overall strength of the apparatus. Other closure mechanisms, such as velcro, may also be used. If desired, access slits 26, 26' may be disposed so as to be beneath a strap in order to promote bag strength.

Figure 3:
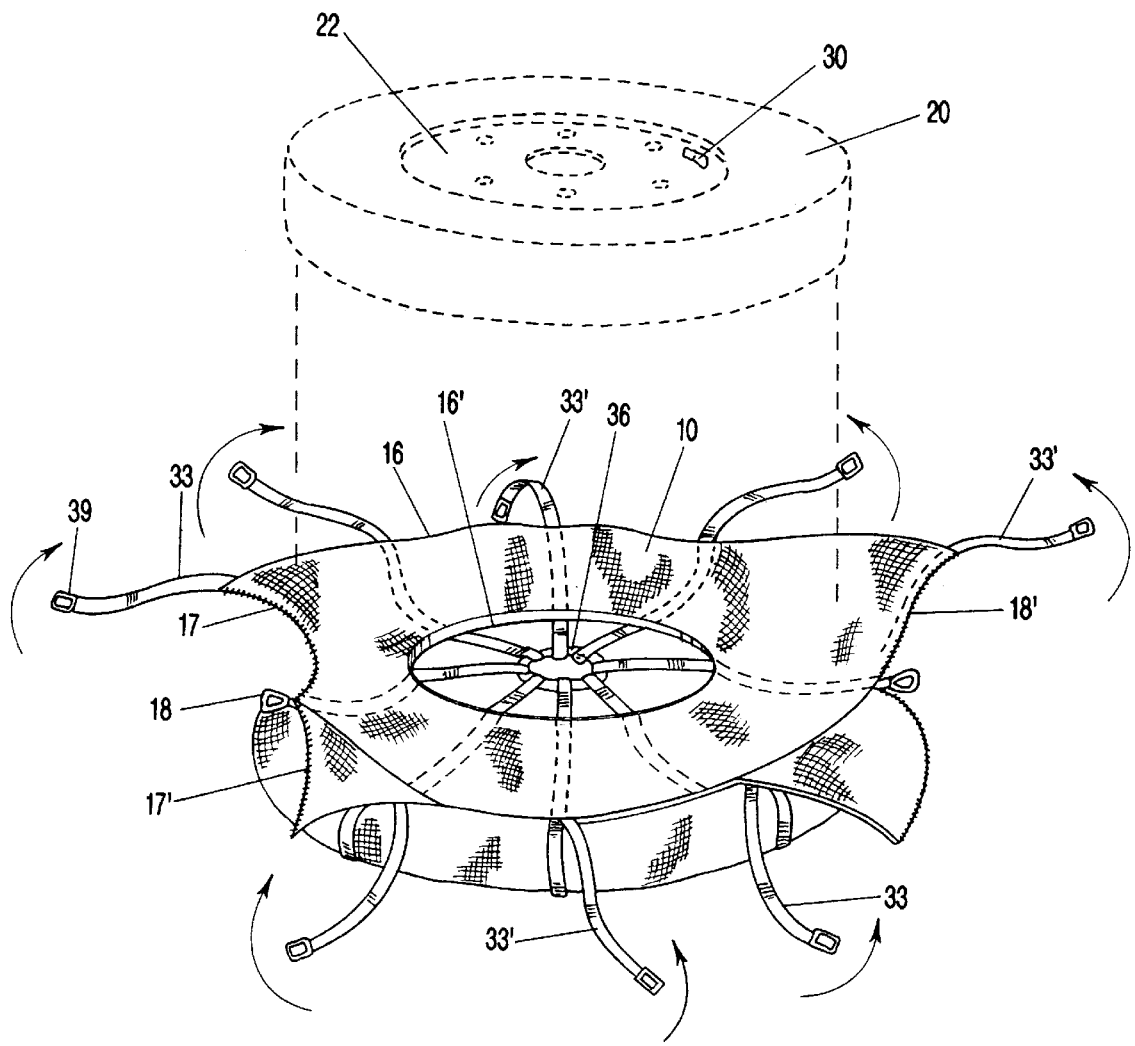
FIG. 3 is a perspective view of a preferred embodiment of the invention, showing the apparatus in the open position, ready to receive a tire therein.

In use, bag 10 may be folded or rolled for storage in, for example, a tool chest on a tractor-trailer rig. The bag is removed from storage, and laid out and opened to the position shown in FIG. 2, with buckles 39, 40 and zippers 18, 18' open. As shown in FIG. 3, tire 20 to be inflated or serviced is placed into open bag 10, with the hub of wheel 22 generally above bottom central support ring 36, which is at all times the central anchor point for the ends of the bottom segments of straps 33, 33'. The apparatus is adaptable to be installed upon a tire that is still upon the axle of the vehicle, provided the tire is jacked up above the ground to permit access to its circumference. Bag 10 is simply opened and wrapped around the tire with the straps skirting the axle as needed (in a manner somewhat suggestive of the common mode of installing snow chains upon a tire).

With tire 20 and wheel 22 in place in open bag 10, the sides of the bag are wrapped up and around tire 20 to bring interior edges 16, 16' toward each other on opposite sides of wheel 22. Zippers 18, 18' are zipped to bring together top edges 17, 17' of each of access slits 26, 26' and to securely close the access slits so that bag 10 is in the overall shape of a torus, nearly entirely enclosing tire 20, as shown by FIG. 5. Straps 33, 33' are also wrapped up and over the bag and tire 20, as suggested by the directional arrows of FIG. 3, and respective pairs of buckles 39, 40 brought together and connected, so that each one of the plurality of straps 33, 33' defines a closed loop running in a vertical plane around the entire tire 20, as seen in FIG. 1. The length of each strap may be adjustable by slip loop devices known in the art, so that when fully installed, the straps are tightened to a significant tension thereby to hold bag 10 snug in place about tire 20. As suggested by FIG. 4, the spoke-like array of the plurality of straps, when installed with top center support ring 37 above the central hub of wheel 22, provides radial reinforcement to bag 10 against the shock wave of an explosion.

With bag 10 installed as seen in FIGS. 1, 4 and 5, the user may nevertheless access valve stem 30, wheel rim 28, and lug nuts (in holes 29) as needed to inflate tire 20 or mount wheel 22 to the vehicle, or otherwise service the tire and wheel combination. Yet, in the event of a catastrophic failure of the tire or the tire-to-wheel seal, the resulting explosion, including most of the shock wave and all the solid parts (such as parts of the tire), are caught and retained by bag 10 rather than becoming dangerous projectiles. The opening of bag 10 is secured so that in the event of an accidental tire explosion, the force of the explosion is mostly contained by the bag, and all the harmful projectiles from the explosion, such as tools in use, pieces of rubber, rim components, tire steel belts, and the like, are contained by the bag rather than flying hazardously outward.

When the tire inflation or service is complete, bag 10 may be removed from tire 20 by the simple expedient of releasing buckles 39, 40 and slipping the bag from around the tire. The bag may then be folded or rolled into a compact space for storage. The bag may thus be used over and over again, although it is contemplated that it will be discarded in the event it actually serves the protective function of containing an explosion.

The invention, broadly described, therefore, is a fabric bag specially adapted to receive and substantially contain a tire while the tire is inflated or serviced, and having sufficient strength not to tear or rupture in the event the inflated tire explodes accidentally.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for protectedly working on a tire during mounting or inflation, said apparatus comprising:

a flexible bag to contain the tire;

a plurality of straps removably wrapped around said bag; and a plurality of fastening devices for securing said wrapped straps around said bag.

2. The apparatus of claim 1 wherein said bag comprises at least one fabric selected from the group consisting of woven fiber material and ballistic nylon.

3. The apparatus of claim 1 wherein said bag comprises a substance that is permeable to air.

4. The apparatus of claim 1 wherein said bag comprises at least one shape selected from the group consisting of toroidal, donut and square shape.

5. The apparatus of claim 1 wherein said straps comprise an arrangement radiating outward from the center of said bag.

6. A method of protectedly working on a tire during mounting or inflation comprising the following steps:
   a) inserting a tire into a flexible bag;
   b) securing the tire within the bag; and
   c) mounting or inflating the tire.

7. The method of claim 6 wherein the step of inserting a tire into a flexible bag comprises inserting a tire into a bag comprising at least one fabric selected from the group consisting of woven fiber material and ballistic nylon.

8. The method of claim 6 wherein the step of inserting a tire into a flexible bag comprises inserting a tire into a toroidal-shaped bag.

9. The method of claim 6 wherein the step of inserting a tire into a flexible bag comprises inserting a tire into a bag comprising a substance that is permeable to air.

10. The method of claim 6 wherein the step of securing the tire within the bag comprises securing the tire with a plurality of straps wrapped around the bag.

* * * * *